(12) United States Patent
Prokaski

(10) Patent No.: US 6,643,972 B2
(45) Date of Patent: Nov. 11, 2003

(54) DEVICE TO ASSIST IN THE THROWING OF A CAST NET

(76) Inventor: Phillip K. Prokaski, 9203 Shady Oaks Dr., Austin, TX (US) 78729

( * ) Notice: Subject to any disclaimer, the term of this patent is extended or adjusted under 35 U.S.C. 154(b) by 0 days.

(21) Appl. No.: 09/847,261

(22) Filed: May 2, 2001

(65) Prior Publication Data

US 2002/0166279 A1 Nov. 14, 2002

(51) Int. Cl.[7] .................. A01K 73/00; A01K 74/00
(52) U.S. Cl. .................................... 43/8; 43/7
(58) Field of Search ................. 43/7, 8; 446/46, 446/48; 473/569, 571, 588, 589

(56) References Cited

U.S. PATENT DOCUMENTS

| | | | | |
|---|---|---|---|---|
| 100,466 A | * | 3/1870 | Taylor | 446/46 |
| 876,148 A | * | 1/1908 | Cloud | 43/8 |
| 1,154,563 A | * | 9/1915 | Dorsey | 43/8 |
| 2,565,955 A | * | 8/1951 | Dobreff | 43/7 |
| 2,723,481 A | * | 11/1955 | Schwartz, Sr. | 43/7 |
| 2,728,164 A | * | 12/1955 | Mears | 43/7 |
| 2,732,647 A | * | 1/1956 | Byars | 43/8 |
| 2,767,501 A | * | 10/1956 | Bjorksten | 43/7 |
| 3,213,560 A | * | 10/1965 | Phillips | 43/7 |
| 4,324,061 A | * | 4/1982 | Stepp | 43/8 |
| 4,337,950 A | * | 7/1982 | Gidge | 473/588 |
| 4,607,448 A | * | 8/1986 | Brief | 43/8 |
| 4,790,098 A | * | 12/1988 | Lu | 43/7 |
| 5,800,237 A | * | 9/1998 | Cummings | 446/48 |
| 6,065,239 A | * | 5/2000 | Thomas et al. | 43/7 |
| 6,474,012 B1 | * | 11/2002 | Ardern | 43/8 |

FOREIGN PATENT DOCUMENTS

| | | | | |
|---|---|---|---|---|
| FR | | 762264 B1 | * 4/1934 | 43/7 |

OTHER PUBLICATIONS

Susan Cocking, Cast Nets Made Simple, *The Miami Herald* Friday Jun. 2, 2000 Miami Florida.
Jerry Gerardi, Boca Raton News Apr. 13, 2000.

* cited by examiner

Primary Examiner—Darren W. Ark
(74) Attorney, Agent, or Firm—Shaffer & Culbertson, L.L.P.

(57) ABSTRACT

A device for throwing a cast net that facilitates the throwing and improved deployment of said cast net. The device is predominatly disc shaped and contains a multiplicity of radial openings that span an area from near the periphery of said disc to a central portion of the disk. The device is attached to a typical cast net by passing the individual draw strings from the central hub of the net, down through the separate radial openings in the disc shaped device, to the weighted peripheral line of the cast net. The device provides the means for imparting a uniform centrifugal motion to the weighted cord of a typical cast net, then allows the draw strings to freely slide through the device while the net expands. After net deployment, the device then allows the draw strings to move from a point near the circumference of the device to a central portion of the hub of the device upon retrieval.

11 Claims, 5 Drawing Sheets

DEVICE TO ASSIST IN THE THROWING OF A CAST NET

FIELD OF THE INVENTION

This invention relates to cast nets used for fishing, specifically to a cast net deployment assisting device, a cast net incorporating the deployment assisting device, and a method of deploying cast nets.

BACKGROUND OF THE INVENTION

Nets have been used for many centuries for capturing fish and other aquatic life. These nets come in many shapes and sizes to meet several different applications and quarry sizes.

One type of fishing net in particular is called a cast net. It is comprised of a netlike fabric, typically disc shaped in it's deployed configuration with a thicker weighted cord attached to the circumference of the net. Radial draw strings are tied in even increments to the circumference of the weighted cord and are routed and joined, through a central hub, to the central part of the net, much similar to the spokes on a bicycle wheel.

In normal casting operation, the cast net is first grasped towards the central hub, with the weighted cord hanging downwards. The net then exhibits a vertical and predominately conical shape with the central portion in the raised position and the weighted circumference in the lower position in a scalloped circular pattern. During deployment, it then becomes the operators task to accurately transform the conical shaped net into a predominately planar disc shaped net, while at the same time directing this disc shaped net upon the water surface above the aquatic life being sought.

Upon contacting the water, the weighted cord around the perimeter of the net rapidly descends in the water column and the aquatic animals are restrained between the net and either the water floor or the weighted net perimeter as the net returns to a predominately conical configuration. The draw string lines are then slowly retrieved while the central hub of the net gravitates downward and eventually comes to rest in close proximity to the weighted periphery of the net. At this point, the net has been transformed into a generally toroidal shape, thus entrapping the aquatic animals within the net.

While the construction of a typical net is simple, the mechanics of throwing one is far more difficult. It takes many hours of practice to achieve a consistent circular deployment. The almost universal method of achieving the net transformation from the vertical conical configuration to a horizontal disc configuration involves lifting a portion of the weighted cord and applying centrifugal force to the remaining weighted cord by swinging the entire net around the operator in a motion similar to an Olympic Hammer toss. The weighted circumference of the net then provides the centrifugal force necessary to pull outwardly on the net and to expand the diameter of the weighted cord, thus the diameter of the cast net.

Many of the traditional methods of throwing a cast net require placing portions of the wet and dirty net either held in one's mouth, or placed over one's shoulder or arm. Even with hours of practice, these methods are inconsistent. Often a potentially good throw is spoiled by having the net catch on nearby upright objects such as boat seats, fishing poles, landing nets, or snag on the buckles and buttons of the operator.

Most currently used throwing methods also require that the net be swung around the operator through at least a 270 degree rotation, which means that the operator must turn his back and temporarily loose sight of the intended moving target.

As can be well imagined, the successful deployment of said cast nets can only be reasonably assured in the hands of trained and practiced individual. The weekend fisherman rarely becomes efficient enough at throwing a cast net to use the net as his primary source of bait and shrimp, and is thus forced to rely upon the expensive and inconsistent supply of bait fish from bait shops.

In spite of the antiquity of such nets, little has been done to facilitate the ease of use or their deployment. U.S. Pat No. 4,607,448 addresses a conical device that attempts to preform the weighted portion of vertically held net into a more circular shape. The device then becomes the throwing device. Unfortunately this device requires the operator to hold the entire weight of the net, which can total 3–15 pounds, solely by the strength of the operator's wrist. This action can become quickly tiring.

U.S. Pat. No. 4,324,061 claims to facilitate the deployment of a cast net by providing a means of holding up a portion of the weighted cord rather than having the operator place a portion of the dirty weighted cord in his teeth. Although marginally advantageous for smaller nets, the use of this device on larger nets is ineffective because the longer nets would drag on the ground.

Recently, attempts have been made to facilitate the deployment of cast nets by rigidly affixing a ring to the central hub portion of the net. The purpose of said device is to hold the leading portion of the conically held net open prior to throwing, much the same as the multitude of the current casting methods that require the operators to hold the leading portion of the net in their teeth or over their shoulders. This design does nothing to address the imparting of a centrifugal motion to the individual weights other than to swing them, in unison around the operator similar to the many other methods previously mentioned. In addition, this device is only practical for use on smaller three to five foot radius nets because the deployment requires an obstacle free area around the operator greater than the radius of the net, and like the many other casting methods, requires the operator to lose sight of his target as the net is swung through a circle in excess of 270 degrees. In addition, the centripetal force required to manipulate larger heavier nets with a very large radius could prove to be destructive to the netting fabric.

SUMMARY OF THE INVENTION

The primary objective of this invention is to provide a device which is easy to use and provides for a more effective and consistent deployment of a cast net by even the novice operator.

Another objective of this invention is to effectively separate and pre-align the scalloped portions of a vertically hung cast into a circular configuration, and to prevent tangling when thrown, while at the same time, not restricting the effective opening and closing of the net.

Another objective of this invention is to provide centrifugal force at or near the multitude of peripheral weights rather than at some point further up the netting fabric.

Another objective of this invention is to reduce the circumferential and lower body clearance area required to launch a cast net such as while in waist deep water, or on a boat or pier with raised obstructions within a several foot radius.

Another objective of this invention is to provide a method of throwing of a cast net that does not require the operator to rotate and loose sight of the moving target prior to throwing.

Another objective of this invention is to provide an improved cast net throwing device that is particularly effective on nets of all of the commonly used radiuses from three to eight feet and more.

Another objective of this invention is to provide a cast net throwing device that is unaffected by wind, and that can be used with equal effectiveness on targets from zero to twenty plus feet from the operator.

These objects are accomplished by slidably mounting a throwing device on the drawstrings on a lower or first side of the net material of a cast net. The throwing device includes a number of transverse drawstring openings spaced apart radially about a throwing device center axis. In the preferred form of the invention, a separate drawstring opening is provided for each drawstring. In this preferred form of the invention, each drawstring extends through its respective drawstring opening and the opening is sized so that the drawstring may freely slide through the respective drawstring opening. Importantly, the throwing device is not attached directly to the net material but instead is free at all points to move relative to the net material with each drawstring sliding through the respective drawstring opening.

The throwing device, being slidably mounted on the drawstrings, is capable of sliding on the drawstrings between a deployed position and a initial position. In the initial position, the throwing device is positioned at the distal ends of the cast net drawstrings adjacent to the weighted peripheral edge of the cast net material. Since the throwing device is of relatively small diameter as compared to the net material, holding the cast net by the central hub and placing the throwing device in the initial position causes the net to fold together to form generally a cone shape with the peripheral edge of the net material forming the base of the cone located adjacent to the peripheral edge of the throwing device and with the net hub forming the tip of the cone shape. In the deployed position, however, the net material is laid out generally in a plane with the throwing device located at a center of the laid-out net material. The drawstrings in this position extend from the cast net hub radially along the plane of the laid-out net material through the respective drawstring opening in the throwing device and ultimately to the weighted periphery of the cast net.

In the preferred form of the invention the drawstring openings in the throwing device each comprise a radially extending slot. Each such slot extends from a central portion of the throwing device to a point near the peripheral edge of the throwing device. Each drawstring slot may be generally linear in shape or may be curved, with each slot curved in a common direction.

Regardless of the particular shape of the drawstring openings, the openings allow the drawstrings to slide therethrough so that the throwing device may move along the drawstrings from the initial position to the deployed position. This movement of the throwing device may be accomplished by imparting a spin to the throwing device about a central perpendicular axis of the disk while the disk is in the initial position. This spin also imparts a spin to the weighted peripheral edge of the cast net causing the weighted peripheral edge to rapidly expand and cause the net material to assume the generally planar, laid-out shape. As the net material assumes this laid-out planar shape, the drawstrings each slide through their respective drawstring opening in the throwing device, ultimately placing the throwing device in the deployed position at the center of the laid-out net material.

The throwing device provides a fixture which, in the initial position, causes the peripheral weighted edge of the cast net to conform to a shape that may be spun to generate the desired net deploying centrifugal force. Placing the throwing device in the initial position also organizes the net material in a convenient shape allowing the net to be held easily by the user prior to imparting the spin and throwing the net. The throwing device also organizes the drawstrings and provides a guide for the drawstrings to deploy properly to the laid-out position of the net material.

These and other objects and advantages of this invention will become apparent upon consideration of the following description and claims.

DESCRIPTION OF PREFERRED EMBODIMENTS

Figure 1:
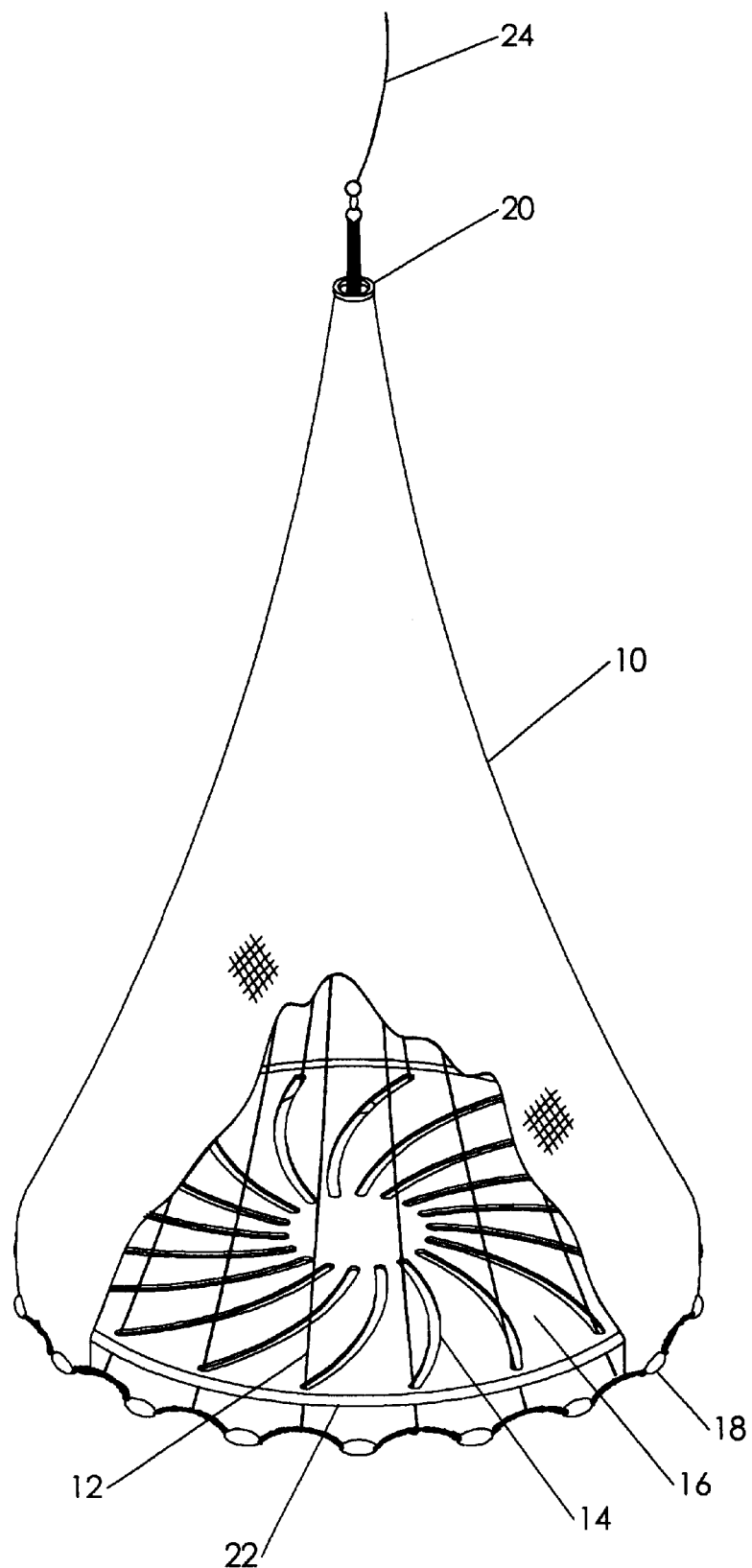
FIG. 1 is a cut away isometric view of a cast net and throwing device embodying the principles of the invention in the initial position.
Figure 3:
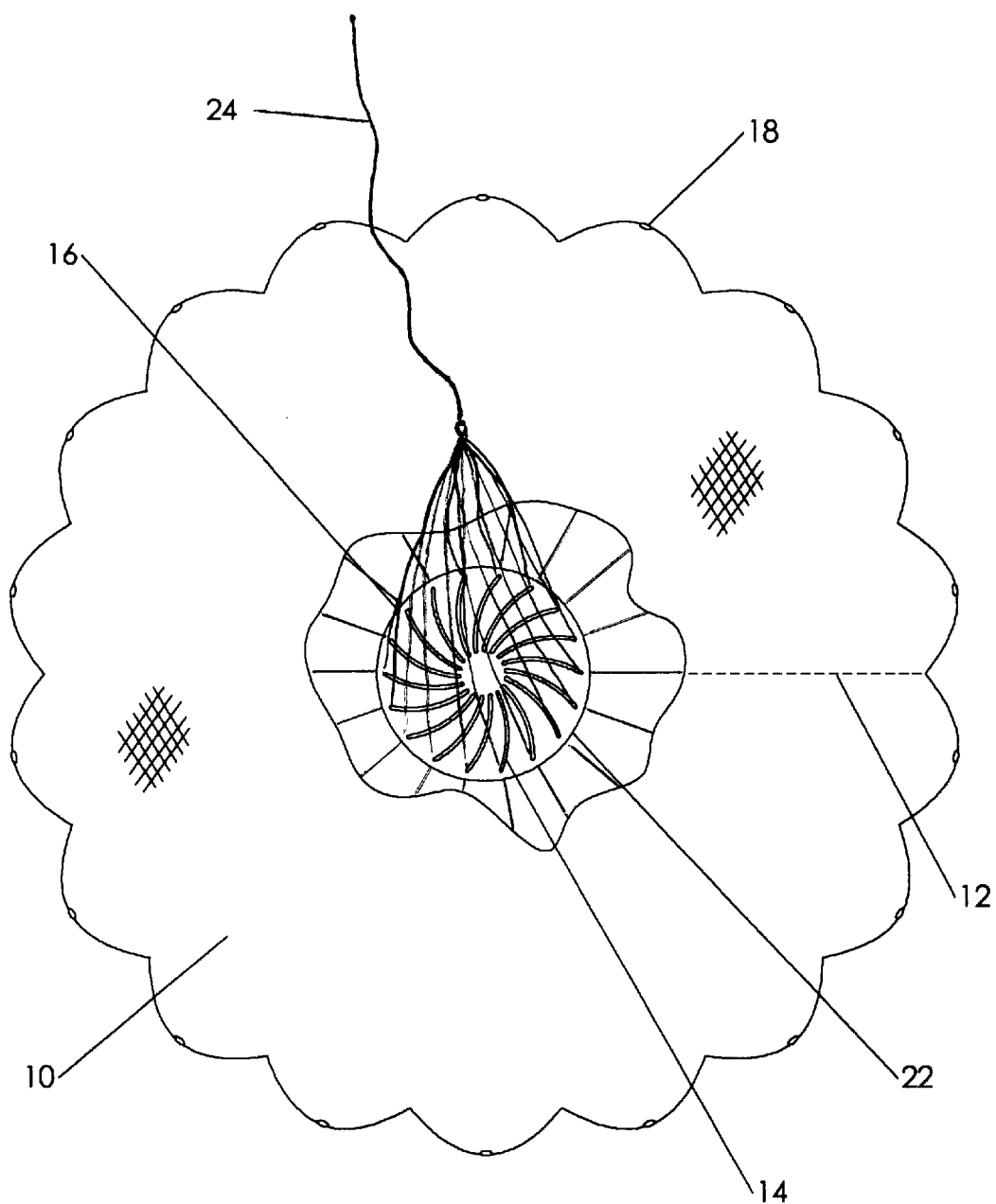
FIG. 3 is a top cut away view of the cast net and throwing device with the net material laid out along a common plane and with the throwing device in the deployed position.

As shown in FIGS. 1 and 3, a throwing device 16 embodying the principles of the invention is adapted to be used with a cast net that includes a piece of net material 10, a weighted peripheral edge or peripheral weight arrangement 18, and a central hub 20. Drawstrings 12 extend from a distal end connected at or near weighted peripheral edge 18 to a proximal end that passes through an opening in central hub 20. Drawstrings 12 extend along a lower or first side of net material 10 with the proximal ends extending through hub 20 to the opposite side of the net material 10. Drawstrings 12 are also connected together at their proximal ends and are connected ultimately to a retrieval line 24. It will be appreciated that the weighted peripheral edge 18 may comprise a cord or line connected to net material 10 and having weights spaced apart generally evenly along the cord or line.

Throwing device 16 comprises a disc shaped device having a peripheral edge 22 and a number of drawstring openings 14. Drawstring openings 14 are radially spaced apart about a center of the throwing device. The preferred drawstring openings 14 comprise elongated slots extending radially from the center of throwing device 16. Several different drawstring opening shapes will be described below with reference to FIGS. 5 through 8.

Figure 2:
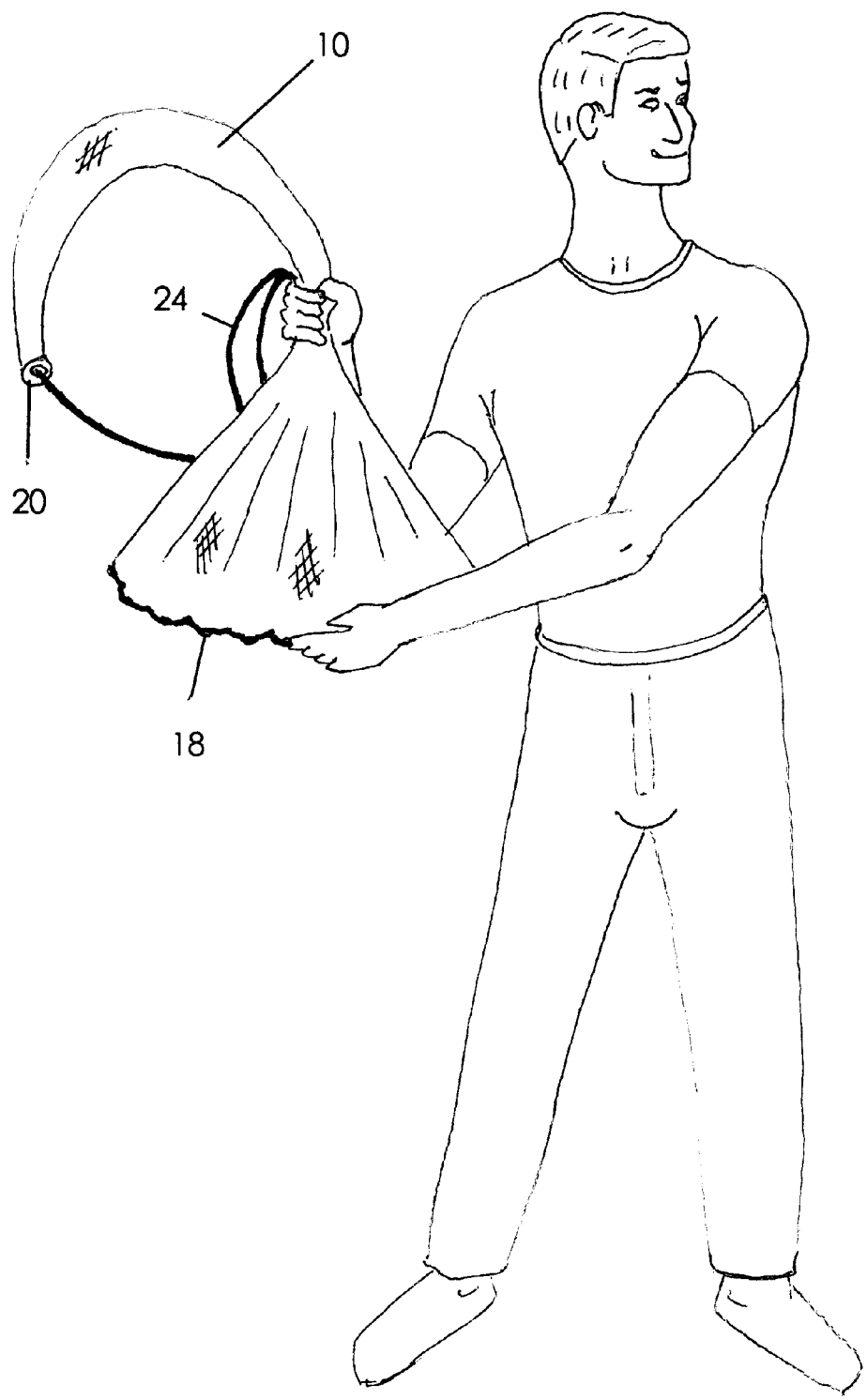
FIG. 2 is an isometric view of an operator holding the cast net and throwing device combination in a preferred throwing position, with the throwing device in the initial position.

FIGS. 1 and 2 show of the throwing device and an initial position. In this initial position shown best in FIG. 1, net 10 is folded about central hub 20 with throwing device 16 located adjacent to the weighted peripheral edge 18 of the cast net. When suspended by hub 20, the cast net assumes a general generally conical shape when throwing device 16 is in this initial position. Central hub 20 forms the tip of this conical shape, with net material 10 forming the sides, and the weighted peripheral edge 18 and peripheral edge 22 of device 16 forming the base of the conical shape.

As best shown in FIG. 2, when the throwing device is in the initial position, it forces the cast net into a folded shape that is easily handled by a user. The user simply gathers up the net material 10 at some intermediate point between central hub 20 and net edge 18 with one hand, and holds the weighted peripheral net edge 18 and peripheral edge 22 of throwing device 16 with the other hand. From this position shown in FIG. 2, the user may easily impart a spin to both the throwing device 16 and the cast net as will be described below.

FIG. 3 shows the cast net with throwing device 16 in a deployed position. In this deployed position, net material 10 is laid out generally in a plane and throwing device 16 is located at the center of the laid-out net material. It will be appreciated that in order for throwing device 16 to move from the initial position shown in FIGS. 1 and 2 to the deployed position shown in FIG. 3, each drawstring 12 must slide through its respective drawstring opening 14 in throwing device 16. It will also be noted by comparing FIGS. 1 and 3 that throwing device 16 is free at all points to move with respect to net material 1o. That is, throwing device 16 is connected to the net material only by virtue of the drawstrings 12 passing through drawstring openings 14 formed in the throwing device. This arrangement with the throwing device 16 slidably mounted on the cast net drawstrings 12 allows the throwing device and net material 10 to move freely relative to each other.

In order to throw the cast net and move throwing device 16 from the initial position shown in FIGS. 1 and 2 to the deployed position shown in FIG. 3, it is necessary to impart a spin to the throwing device held in the initial position. As throwing device 16 spins about a central axis generally perpendicular to the plane of the device, the weighted peripheral edge 18 of the cast net is also forced to spin generally about the same axis. The centrifugal force of the spinning weighted peripheral edge 18 causes it to expand outwardly to the position shown in FIG. 3. As weighted peripheral edge 18 expands, drawstrings 12 slide through drawstring openings 14 in throwing device 16 until the weighted peripheral edge reaches its final expanded position with the throwing device aligned in the center of net material 10. The spin necessary to cause net 10 to reach its final laid-out position may be readily imparted from the preferred throwing position shown in FIG. 2.

Figure 4:
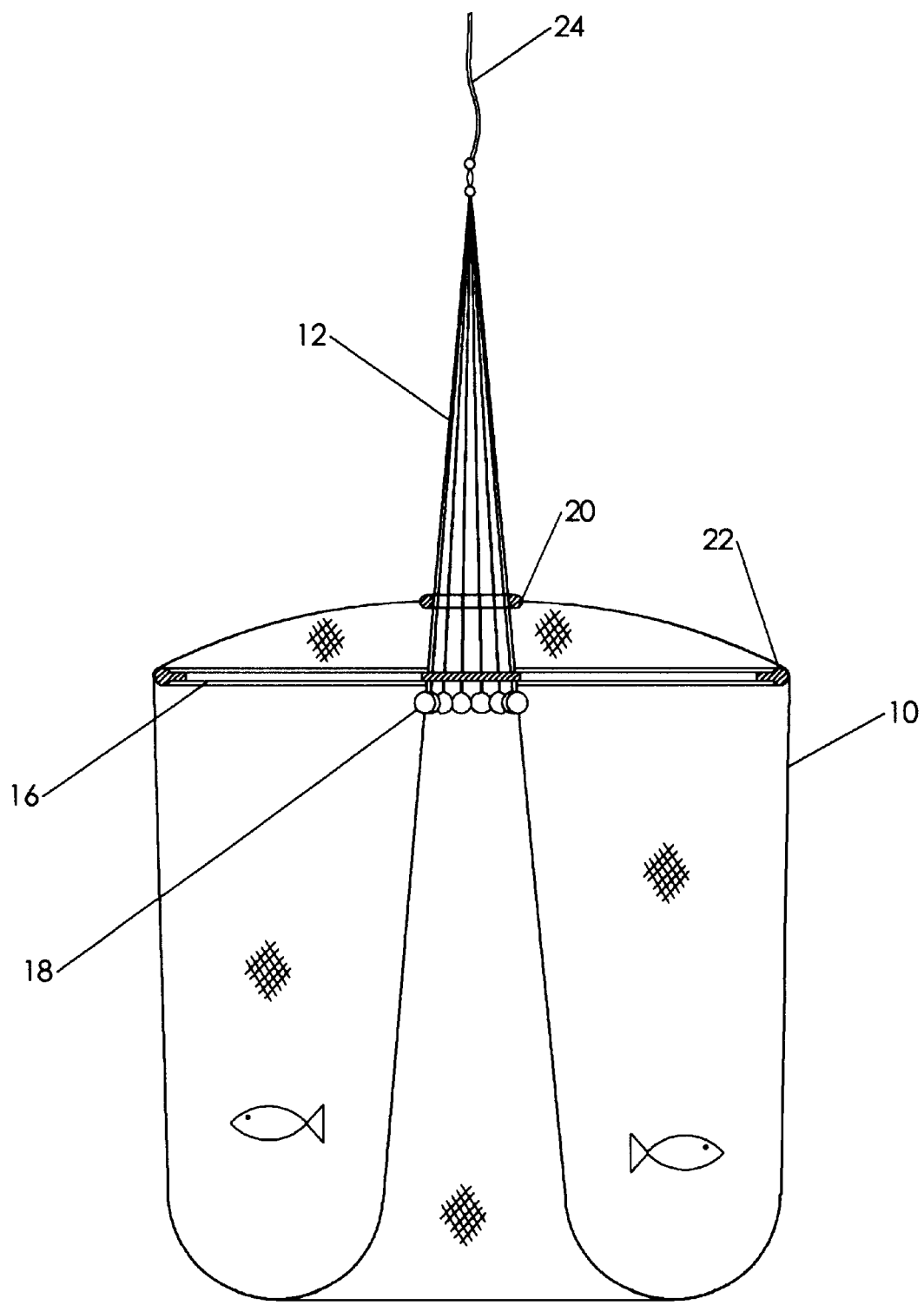
FIG. 4 is a cross section view of a cast net and throwing device combination according to the invention in a position reached after the cast net has been deployed and the drawstrings have been pulled through the central hub to place the net in position to be retrieved to collect the aquatic life captured in the cast net.
Figure 5:
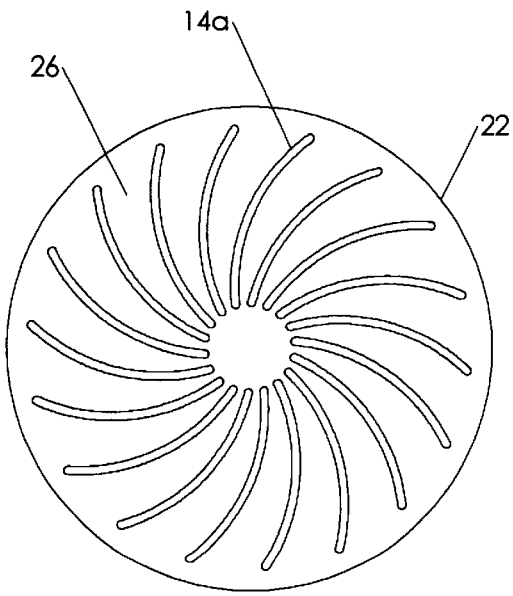
FIG. 5 is a top view showing one preferred drawstring opening shape according to the invention in relation to the peripheral edge of the throwing device.

FIG. 4 shows the cast net and throwing device 16 combination according to the invention after the cast net has been thrown and after drawstrings 12 have been pulled up through the opening in hub 20. In this position, the desired quarry is trapped within net material 10 and the cast net may be pulled from the water to collect the trapped quarry. It will be noted that throwing device 16 does not interfere with the movement of drawstrings 12 from the extended position shown in FIG. 3 to the retrieval position shown in FIG. 4.

FIGS. 5 through 8 show various alternative shapes for the draw string openings 14 in throwing device 16. The drawstring opening 14a shown in FIG. 5 comprises an elongated curved opening defined between two curved spokes extending from a central part of the throwing device to the throwing device peripheral edge 22. This is the shape of drawstring openings 14 shown in the embodiment of FIGS. 1 and 3. It will be noted that all of the elongated curved drawstring openings 14 shown in FIGS. 1 and 3 are curved and a common direction.

Figure 6:
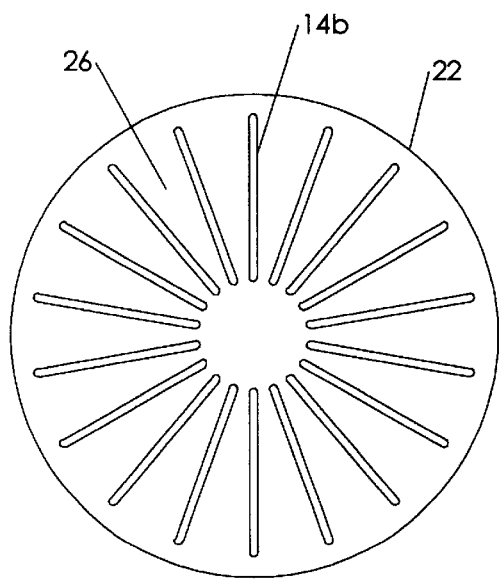
FIG. 6 is a top view showing an alternate form of the throwing device according to the invention.
Figure 7:
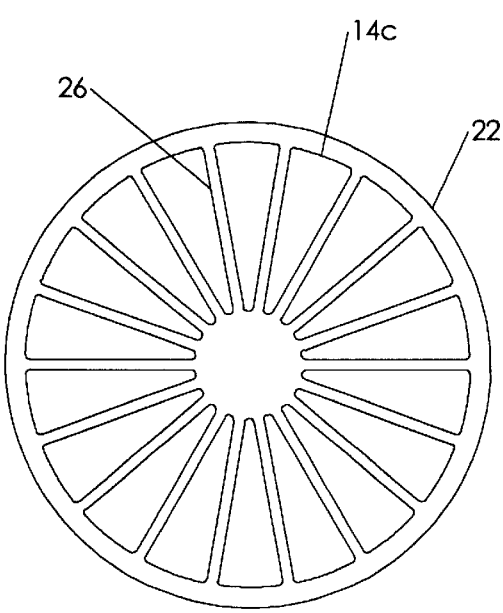
FIG. 7 is a top view showing another alternate form of the throwing device according to the invention.
Figure 8:
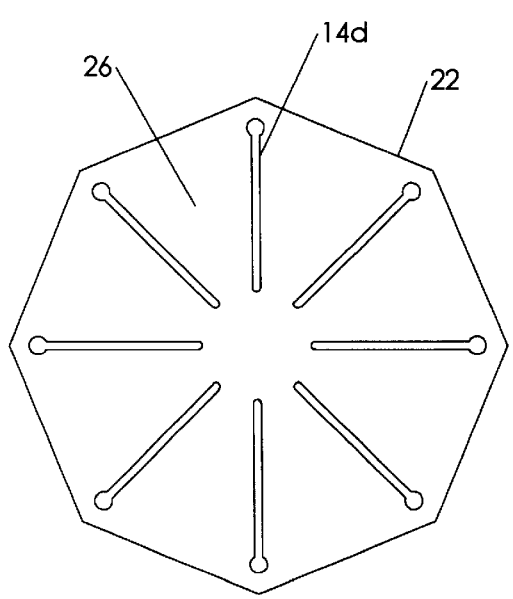
FIG. 8 is a top view showing yet another alternate form of the throwing device according to the invention.

FIG. 6 shows drawstring openings 14b as straight elongated slots extending radially from a center of the throwing device to the peripheral edge 22 of the throwing device. In FIG. 7, the drawstring openings 14c each have generally a pie slice-shape, with each opening formed between spokes extending from a center of the throwing device to the peripheral edge 22 of the throwing device. In the alternate version shown in FIG. 8, the draw string openings 14d each comprise an elongated slot similar to the slot shown in FIG. 6. However, the drawstring openings 14d shown in FIG. 8 include an enlarged rounded area at the end adjacent to the peripheral edge 22 of the throwing device. It will also be noted from FIG. 8 that throwing device peripheral edge 22 need not be circular as shown in the other drawings. The peripheral edge 22 shown FIG. 8 has an octagonal shape for example.

The above described preferred embodiments are intended to illustrate the principles of the invention, but not to limit the scope of the invention. Various other embodiments and modifications to these preferred embodiments may be made by those skilled in the art without departing from the scope of the following claims. For example, although the preferred form of the invention includes a separate drawstring opening for each drawstring in the cast net, adjacent drawstrings may share a common drawstring opening in the throwing device. Also, it will be apparent that a throwing device according to the invention may include more drawstring openings than are necessary for accommodating the drawstring from a particular cast net. For the number of drawstring openings used, each drawstring opening will accept one or more drawstrings as set out in the following claims.

I claim:

1. A cast net including:
   (a) a piece of net material forming generally a disc-shape when laid out in a planar position;
   (b) a peripheral weight arrangement connected to the net material substantially at the periphery of the net material in the planar position;
   (c) a central net opening through the net material, the central net opening being located at a center of the net material in the planar position;
   (d) a number of drawstrings, each drawstring having a distal end connected to the net material generally at the periphery of the net material laid out in the planar position and extending from the distal end along a first side of the net material to a proximal end passing through the central net opening to the opposite side of the net material, the drawstrings being connected together at their proximal ends and being spaced apart radially about the net material laid out in the planar position; and
   (e) a throwing device positioned on the first side of the net material and having a number of drawstring openings, the drawstring openings being spaced apart radially about a center of the throwing device with each drawstring opening having one or more of the drawstrings freely slidable therethrough, the throwing device being free at all points to move relative to the net material with each drawstring sliding through the respective drawstring opening.

2. The cast net of claim 1 wherein each drawstring opening comprises an elongated opening extending from generally a central area of the throwing device to a peripheral edge of the throwing device.

3. The cast net of claim 2 wherein each elongated drawstring opening is curved in a common direction.

4. The cast net of claim 1 wherein each respective drawstring opening includes only a single one of the drawstrings extending therethrough.

5. A cast net including:
   (a) a piece of net material forming generally a disc-shape when laid out in a planar position;
   (b) a peripheral weight arrangement connected to the net material substantially at the periphery of the net material in the planar position;
   (c) a central net opening through the net material, the central net opening being located at a center of the net material in the planar position;
   (d) a number of drawstrings, each drawstring having a distal end connected to the net material generally at the periphery of the net material laid out in the planar position and extending from the distal end along a first side of the net material to a proximal end passing through the central net opening to the opposite side of the net material, the drawstrings being connected together at their proximal ends and being spaced apart radially about the net material laid out in the planar position; and
   (e) a throwing device having a number of drawstring openings, the drawstring openings being spaced apart radially about a center of the throwing device with each drawstring opening having one or more of the drawstrings freely slidable therethrough with the throwing device being otherwise unattached to the net material to enable the throwing device to move free of the net material between a deployed position in which the throwing device is located at the center of the net material laid out in the planar position, and an initial position in which the throwing device is located on the first side of the net material adjacent to the peripheral edge of the net material.

6. The cast net of claim 5 wherein each drawstring opening comprises an elongated opening extending from generally a central area of the throwing device to a peripheral edge of the throwing device.

7. The cast net of claim 6 wherein each elongated drawstring opening is curved in a common direction.

8. The cast net of claim 5 wherein each respective drawstring opening includes only a single one of the drawstrings extending therethrough.

9. A method of deploying a cast net having a generally disc-shaped net material when laid out in a planar position, a central net opening, and a number of drawstrings extending along a first side of the net material from a weighted peripheral edge of the net material to the central net opening, the method employing a throwing device that is not attached at any point directly to the net material, the method comprising the steps of:
   (a) sliding the throwing device along the drawstrings on the first side of the net material to a point at which the throwing device is adjacent to the weighted peripheral edge of the net material so that the weighted peripheral edge of the net material conforms generally to the shape of a peripheral edge of the throwing device;
   (b) imparting a spin to the throwing device and the weighted peripheral edge of the net material about a throwing device center axis extending perpendicular to a plane of the throwing device; and
   (c) allowing the drawstrings to slide through radially arranged openings in the throwing device in response to the weighted peripheral edge of the net material expanding outwardly under centrifugal force resulting from the spin.

10. The method of claim 9 further including the step of segregating each drawstring in a separate one of the radially arranged openings in the throwing disk.

11. The method of claim 9 further including the step of holding the central net opening above the weighted peripheral edge of the net material with the throwing device and weighted peripheral edge of the net material forming a base of a generally conical shape with the net material forming the sides of the conical shape and the central net opening forming the apex of the conical shape.

* * * * *